(12) United States Patent
Baumann et al.

(10) Patent No.: US 9,016,596 B2
(45) Date of Patent: Apr. 28, 2015

(54) METHOD FOR PROCESS DIAGNOSIS AND ROTARY ATOMIZER ARRANGEMENT

(75) Inventors: Michael Baumann, Flein (DE); Torsten Block, Nufringen (DE); Juergen Haas, Knittlingen (DE); Frank Herre, Oberriexingen (DE); Marcus Frey, Weil der Stadt (DE); Alexander Meissner, Stuttgart (DE); Hans-Jurgen Nolte, Besigheim (DE); Bernhard Seiz, Lauffen (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 1053 days.

(21) Appl. No.: 12/669,926

(22) PCT Filed: Jul. 11, 2008

(86) PCT No.: PCT/EP2008/005681
§ 371 (c)(1),
(2), (4) Date: Apr. 29, 2010

(87) PCT Pub. No.: WO2009/012902
PCT Pub. Date: Jan. 29, 2009

(65) Prior Publication Data
US 2010/0211205 A1    Aug. 19, 2010

(30) Foreign Application Priority Data

Jul. 20, 2007   (DE) .................. 10 2007 033 892

(51) Int. Cl.
*B05B 3/02* (2006.01)
*B05B 5/04* (2006.01)

(52) U.S. Cl.
CPC ............. *B05B 5/0415* (2013.01); *B05B 5/0422* (2013.01)

(58) Field of Classification Search
USPC ........ 239/700–703, 223, 224, 222.11, 67, 69; 361/159; 318/34, 35
See application file for complete search history.

(56) References Cited

U.S. PATENT DOCUMENTS

| | | | | |
|---|---|---|---|---|
| 4,703,387 | A | * | 10/1987 | Miller ............................. 361/79 |
| 5,583,751 | A | * | 12/1996 | Nakazawa et al. .............. 363/20 |
| 5,629,870 | A | | 5/1997 | Farag et al. |
| 5,704,977 | A | | 1/1998 | Baumann et al. |
| 5,985,357 | A | * | 11/1999 | Sanada ............................. 427/8 |
| 6,529,135 | B1 | * | 3/2003 | Bowers et al. ................ 340/648 |
| 6,595,208 | B1 | * | 7/2003 | Coffee et al. ............ 128/203.12 |
| 7,131,601 | B2 | | 11/2006 | Nolte et al. |

(Continued)

FOREIGN PATENT DOCUMENTS

| | | |
|---|---|---|
| CN | 1953811 A | 4/2007 |
| DE | 3002206 A1 | 7/1981 |

(Continued)

OTHER PUBLICATIONS

International Search Report for PCT/EP2008/005681 dated Oct. 13, 2008.

*Primary Examiner* — Jason Boeckmann
(74) *Attorney, Agent, or Firm* — Bejin Bieneman PLC

(57) ABSTRACT

A rotary atomizer arrangement and methods for operating the same are disclosed. An exemplary atomizer may be used for the coating of work pieces, and may include a bell plate driven by an electric motor. The exemplary atomizer may further be configured for the detection of errors in the spraying process and/or the drive system of the bell plate, such as by analyzing corresponding parameters of typical values of the drive motor.

20 Claims, 2 Drawing Sheets

(56) References Cited

U.S. PATENT DOCUMENTS

| | | | |
|---|---|---|---|
| 7,328,123 | B2 | 2/2008 | Hooge et al. |
| 2005/0067991 | A1 | 3/2005 | El-Ibiary |
| 2006/0192508 | A1 | 8/2006 | Albers |
| 2007/0240641 | A1* | 10/2007 | Lind .............................. 118/308 |

FOREIGN PATENT DOCUMENTS

| | | |
|---|---|---|
| DE | 3101193 A1 | 11/1981 |
| DE | 4306800 A1 | 9/1994 |
| DE | 10049506 A1 | 4/2001 |
| DE | 102007004819 A1 | 8/2008 |
| EP | 1245291 A2 | 10/2002 |
| EP | 1388372 A1 | 2/2004 |
| EP | 1403746 A2 | 3/2004 |
| GB | 2068150 A | 8/1981 |
| GB | 2068152 A | 8/1981 |
| WO | WO-2005110613 A1 | 11/2005 |
| WO | WO-2007006325 A1 | 1/2007 |

* cited by examiner

METHOD FOR PROCESS DIAGNOSIS AND ROTARY ATOMIZER ARRANGEMENT

CROSS-REFERENCE TO RELATED APPLICATIONS

This application is a National Phase application claiming the benefit of International Application No. PCT/EP2008/005681, filed Jul. 11, 2008, which claims priority to German Patent Application No. 10 2007 033 892.0, filed Jul. 20, 2007, the complete disclosures of which are hereby incorporated by reference in their entireties.

BACKGROUND

The present disclosure relates to an exemplary method for process diagnosis in the coating, particularly the paint-coating, of workpieces such as vehicle bodywork or parts thereof and a corresponding exemplary rotary atomizer arrangement.

Known electrostatic rotary atomizers typically operate with direct charging of the coating material, with the electrically conducting part of the atomizer being placed at a high voltage, so that the coating material can be charged by an electrode device comprising all the electrically conductive parts such as the bell plate, paint tube, screw threaded fixings, etc., with which said material comes into contact. Alternatively, external charging of the coating material with external electrodes is possible.

Conventional rotary atomizers may generally contain a pneumatic drive turbine for the bell plate forming the spraying element, the rotary speed of which can be measured by, for example, optical sensing of rotating markings and transmission of the sensed impulses via optical waveguides, and kept constant by means of a control circuit by controlling the drive air (DE 43 06 800 C2 and EP 1 388 372 B1), although herein the problem exists that, at the start of a coating procedure, when the conventionally provided main needle valve 24 controlling the outflow of coating material from the atomizer, due to the inertia of the control system, the rotary speed can initially fall relatively severely, which leads to coating faults and can only be corrected by complex additional measures.

With the main needle valve 24, in order to compensate with control technology for switching faults such as temporal delays or shifts caused, for example, by component wear, and resulting in coating faults, particularly when a painting robot makes rapid movements, it is necessary to monitor the switching times. For this purpose, it is generally known to detect and evaluate the switch settings with optoelectronic sensors and optical waveguides (EP 1 245 291 B1). However, the waveguides do not always transmit the sensor signals reliably due to interfering or disrupted interfaces and, due to the constant bending movements in a paint robot, have only a very limited lifespan and, due to their arrangement in the robot, can also only be exchanged or replaced with significant effort. In some cases, also, signal evaluation can be too slow for optimum fault compensation.

Furthermore, a variety of process faults and other fault conditions cannot be detected at all during painting operation due to a lack of suitable sensors. Typical faults include, for example, the mounting of an incorrect bell plate, or the complete lack of a bell plate, contact between the bell plate and the workpiece or other surrounding objects, imbalance in the bell plate, bearing wear or incorrect or even completely lacking bearing air in the air bearings usually provided for the bell plate shaft of rotary atomizers and incorrect volume flow rate of the coating material or changes in the viscosity or other properties thereof.

It is generally known to replace the air turbine currently in common use with an electric drive motor for the air-mounted bell plate shaft of a rotary atomizer, e.g., as provided in WO 2005/110613. However, known rotary atomizers generally suffer from the same problems described above. Furthermore, known rotary atomizers generally suffer from the problem mentioned above that, in the case of electrostatic coating, it may be necessary to place the entire rotary atomizer at a high voltage, e.g., on the order of 100 kilovolts (kV). An electric drive motor and the control system therefore cannot be used without further measures in an electrostatic rotary atomizer with direct charging of the coating material.

The voltage separation measures generally required with an electrostatic rotary atomizer for the electric motor-drive of a bell plate and for signal transmission are generally described in the German patent application 10 2007 004 819.1 dated 31 Jan. 2007, the entire contents of which is hereby expressly incorporated by reference in its entirety.

Based, in particular, on known rotary atomizers with conventional air turbines, an exemplary method is provided for process diagnosis and/or for highly dynamic control of parameters of the coating process or of the motor with which one or more of the above-mentioned fault conditions can be recognised as quickly and reliably as possible, so that the required countermeasures can be implemented in a timely manner.

BRIEF DESCRIPTION OF THE FIGURES

Exemplary illustrations of an electrostatic rotary atomizer arrangement are now described in further detail, where the arrangement includes a transformer arrangement having a high voltage insulation device for potential separation and galvanically separated signal transmission between the region of the atomizer at high voltage and a region at low or earth voltage, as described in the aforementioned patent application DE 10 2007 004 819.1. In the drawings.

DETAILED DESCRIPTION

Figure 1:
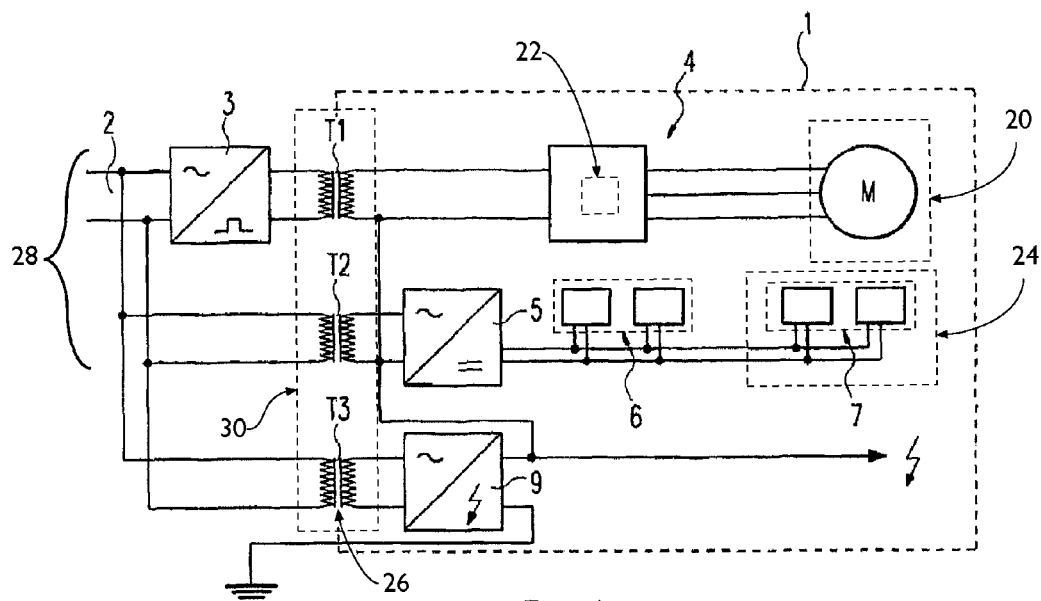
FIG. 1 shows an exemplary atomizer arrangement.

Various exemplary illustrations are provided herein of an atomizer arrangement and methods for using the same. An exemplary atomizer arrangement may include an electrostatic rotary atomizer and a paint robot on which the rotary atomizer is arranged, for example via a typical wrist joint on a front arm of the robot.

By using an electric drive motor for the bell plate of a rotary atomizer which is driven, for example, by a drive shaft, motor fault conditions can be detected extremely rapidly and reliably, during the coating of workpieces, from motor characteristic values, so that such fault conditions can be corrected. Evaluation of the motor characteristic values can suitably be carried out with an electronic control system of the motor itself or with another evaluation system. The exemplary methods described herein can also be applied for highly dynamic control of process parameters of various kinds and parameters of the motor. In many cases, determination of fault conditions can be carried out without the use of sensors outside the motor and the control system thereof, e.g., the optical systems described above. In other examples, evaluation of motor characteristic values can be carried out with external sensors or can be supported thereby. For example, inadmissible robot movements can be detected with accelerometers and corrected or compensated for by changing process parameters.

The respective parameters of interest can be determined and analyzed with the exemplary methods described herein and with the corresponding exemplary atomizer arrangements during a coating or spraying procedure, in particular during the normal painting or coating operation or, in any case, during rotation of the spraying element 20 at speeds with which said spraying element rotates during operation when spraying the coating material. For example, rotary atomizers for powder paints may typically operate at speeds of approximately 3,000 revolutions per minute (RPM) to 12,000 RPM. The exemplary illustrations are also suitable for high speed rotary atomizers with rotation speeds that can typically range between approximately 5,000 RPM and 80,000 RPM.

The exemplary illustrations are also suitable, in particular, for electrostatic rotary atomizers which are connected to a high voltage of the order of 100 kV for direct or external charging of the sprayed paint or other coating material.

Parameters to be determined and analyzed in accordance with the exemplary illustrations may be variables which, during normal coating operation, may deviate from predetermined target values or normal conditions, whereas other faults (e.g., collision of the rotary spraying element with the surface to be coated) can be detected or prevented by other means.

The correction of any detected faults can be made dependent, particularly given constantly changing parameters of the spraying procedure or the bell plate drive system, on whether an acceptable limit value is exceeded. In general, when faults are detected, an alarm signal may be generated and/or an automatic intervention into the monitored process may be carried out in order to carry out the relevant required measures, e.g., increasing current to a drive motor, etc.

Typical characteristic values of the electric drive motor that may be monitored in exemplary systems and methods include, merely as examples, a size or magnitude of the current, a current pattern, electrical power consumption, torque or load torque, positive or negative acceleration, rotary speed, or the like. Process or drive parameters that can be analysed or determined from these characteristics may include, for example, a load on the drive system from the bell plate and/or the coating material fed thereto, imbalances in rotating elements and/or the mounting of the drive shaft, or the like.

Use can be made of the fact, for example, that with an incorrect bell plate installed (e.g., one that is lighter or heavier than intended), or with the bell plate missing, different motor torques act and there is a different power requirement than during normal use of the correct or intended bell plate. Due to the differing torque requirement and different acceleration behavior, the different moments of inertia of bell plates, which can be made from different materials, such as aluminium, steel, titanium or plastics, etc. can be automatically deduced. The different bell plate types which are characterized by their specific geometrical dimensions and features can also be deduced. Based on the evaluation, the correct bell plate can then be chosen and mounted.

Larger torque or power requirements or a fall in the rotary speed can also result from increasing wear of the bearings of the drive shaft, as a result of which not only do air bearings come into consideration, but also roller bearings and any other bearing designs. If a change in the relevant characteristic values due to unacceptably high bearing wear is detected, then the mounting and possibly other components of the atomizer could be exchanged or repaired before even greater damage occurs.

Monitoring of the bearing air can also be particularly useful in examples employing air bearings. For this purpose, the possibility exists, for example, of determining the motor torque while static and then, following, for example, a generally gradual or slow starting of the motor, to determine the air volume flow rate depending on the motor rotary speed and by evaluating the motor characteristic values. Of particular importance in this context is the possibility of determining, without further sensors whether, on starting the motor, any bearing air flows at all. A lack of bearing air would be detected due to the huge rise in motor torque required caused by friction in the bearing, so that the motor can be switched off to prevent otherwise inevitable damage to the motor. Monitoring of the bearing air may also be useful during operation with the motor running.

Another useful parameter that can be analyzed to determine problems with an exemplary atomizer arrangement is any parameter indicating a balance/imbalance of the bell plate. Any imbalance in the bell plate or other eccentricities in the drive shaft may be measured, for example, by evaluating the motor characteristic values, in order that suitable countermeasures may be applied if inadmissible values are detected and thereby to prevent damage to the mounting or, if bearings are blocked, to prevent the rotating bell plate becoming detached and flying off the drive shaft.

Other parameters that may be used are those relevant to the coating material. By evaluating the acceleration and/or braking behaviour of the drive motor, a volume flow rate of the coating material can be monitored, particularly by means of the linear rise of the acceleration or braking forces (acceleration and braking ramps). By detecting the power or the torque or through the effect on the rotary speed, properties such as viscosity, density, adhesion, cohesion, etc., of the paint or other coating material to be applied and changes therein can be determined.

It may also be useful to evaluate torque behavior of the motor not, or not only in normal operation, but rather without spraying coating material, and thereby to simulate the loading of the motor by the bell plate with an electrically generated artificial counter-torque, for example, using the eddy current principle or by other means.

In general, the exemplary atomizers and methods can be used with, for example, interior and exterior painting of vehicle bodywork, to improve significantly the quality and precision of the application. One reason therefor is the possibility of measuring and correcting rotary speed changes substantially faster with the electronic control system of the electric motor than with the above-described optoelectronic and pneumatically operating rotary speed control circuit of conventional air turbines, so that, for example, on opening the main needle valve 24, a significant fall in rotary speed and corresponding coating faults may be avoided.

Compensation for changes in switching times in the main needle valve 24 can be significantly improved by the exemplary atomizers and methods, since evaluation of the rotary speed pattern or other motor characteristic values is significantly more dynamic and precise compared with known atomizers. According to another aspect, the switching time analysis according to the exemplary illustrations enables monitoring of coating materials mixed from two or more components, such as 2k paints, the components of which, comprising stock paints and hardeners, are delivered to a mixing device before or in the atomizer. For example, it is generally important that the two dosing devices are each started at their respective correct times. According to the exemplary illustrations, by evaluation of, for example, the variation of the motor torques, the loading on the motor by each of the two components can be determined over time, so that faults due to temporal shifting of the control signals to the dosing device(s) can be corrected. As a result, the complete lack of one of the two components or an incorrect viscosity or other material property of either of the two components can be ascertained from the motor characteristic values. A lack of homogeneity or insufficient mixing could also be detected, since the motor would then be loaded differently (e.g. on blockage of the mixer) than with correct mixing.

Evaluation of motor characteristic values can suitably be carried out by an electronic processor 22, for example, a microprocessor included in the motor control system, possibly by comparing the characteristic value pattern determined by the evaluating circuit with boundary conditions stored in, for example, an external control system in the form of target curves, reference curves or calibration curves, and the creation of suitable deviation signals in the event of fault conditions. It can thereby be precisely determined what changes of motor characteristic values are due to which causes or parameters of the spraying procedure or the bell plate drive. For example, viscosity changes in the coating material have distinctly different effects on the motor behaviour than the sudden loading caused by the coating material on opening of the main needle valve 24, so that the respective causes of the characteristic value changes can be generally distinguished without difficulty.

Suitable electric motors may operate at any speed that is convenient. For example, electric motors may be employed that drive the bell plate of a high speed rotary atomizer at least 3,000 RPM, and between 10,000 RPM and 80,000 RPM in some examples. Suitable examples of these electric motors are commercially available in a variety of types. A highly dynamic drive control system suitable for these motors which is specifically conceived for the evaluation of characteristic values and with which the characteristic value evaluation according to the exemplary illustrations can be carried out is also commercially available, for example from Aradex AG, of 73547 Lorch in Germany, whose systems have previously mainly been used for the cutting machining of workpieces and other machine tools and, in particular, for highly dynamic servo drive technology.

Turning now to FIG. 1, a region 1 is illustrated that includes components of an electrostatic rotary atomizer arrangement that are at an elevated electrical potential, e.g., a high voltage, relative to objects outside the region 1, specifically those of the actual atomizer or of an arrangement consisting of the atomizer, a wrist joint and, in the case in question, with some elements of a front arm of the coating robot which are also at a high voltage. The front arm (not shown) can be made, as is typical, from an insulating material. Apart from the primary circuits of the transformer arrangement 30 described below, all the components under consideration in region 1 can be at the high electrical potential voltage.

For the electrical supply of region 1, a two-pole or multipole external supply line arrangement 2 may be employed which, according to the representation, feeds the mutually parallel primary coils of the three transformers T1, T2 and T3 which are configured as isolating transformers, e.g., electrical insulating device 26, with high voltage insulation gaps (e.g., for more than 100 kV or even for more than 150 kV).

The alternating voltage of the supply line arrangement 2, e.g., primary and secondary circuits 28 feeds the primary coil of the first transformer T1 via a converter 3 with voltage pulses which, on the secondary side, supplies the drive 4 operating with frequency regulation of a synchronous or other electric motor M, which is provided in place of the air turbine which is more usual for driving the atomizer bell in rotary atomizers. The motor M may be any motor suitable for the driving purpose under consideration. For feeding and controlling the motor M, a suitably adapted control and evaluating system (drive 4) from the aforementioned Aradex AG can be used. The power supply may also be separated from, for example, a digital rotary speed control system. A transmission frequency of the separating transformer can, as known, be higher than the frequency at which the motor M is fed. The rotary speed of rotary atomizers and thus of the motor M can be up to, for example, 100,000 RPM or more.

The secondary coil of the second transformer T2 may, by contrast, serve to supply power to components of the atomizer including the actuators 6, sensors 7 and electronic elements situated in region 1 which is at high voltage. As shown in the illustration, the alternating voltage generated by the transformer T2 can be converted by a converter 5 into a supply direct current. Typical examples of the components shown only schematically at 6 and 7 are actuators such as control and drive circuits for valves 24 and for flow rate, rotary speed and other control circuits as well as sensors for the switching of valves 24, rotary speed, flow volume, temperature, pressure of the coating material, etc. The actuators considered here can include, for example, further electric or other motors, for example, as dosing pump drives.

The secondary winding of the third transformer T3 may feed a converter 9 which, from the input alternating voltage, supplies the electrical potential or high voltage needed for electrostatic charging of the coating material, or supplies a high voltage generator (not shown) of the atomizer. The high voltage may be applied to the internal or external electrode arrangements (not shown) that are usual with electrostatic atomizers, for direct or external charging of the coating material.

Apart from the sensors and actuators of the atomizer, further components of the application equipment including those outside the atomizer may also be fed by the exemplary transformer arrangements, that is also actuators and sensors of the application equipment which are situated at other sites on the coating machine and can be at high voltage there or at low or earth voltage, e.g., ground potential. Also included are components, such as color changers, which can be at either high voltage or earth voltage, depending on the system. The transformer arrangement 30 can possibly supply all application components that may be present on a robot with the respective electrical power each requires.

If relatively heavy standard designs for the transformer arrangement 30 are mounted as independent components in the atomizer or in the robot arm of, for example, a painting robot, they may impair movement dynamics of the robot. For this reason, it may be suitable to integrate the transformer or a transformer winding into the body of the robot arm such that said transformer or transformer winding serves as a supporting element of the robot arm and imparts the necessary stiffness or at least contributes thereto. As a consequence, overall weight of the atomizer arrangement including the robot arm is not significantly increased by the transformer.

The transmission of control and sensor signals to and from the actuators and sensors situated in the high voltage region 1 and to and from the motor control system may advantageously be galvanically separated, in order to limit or preclude entirely any influence from the high voltage. For this purpose, in particular, an optical or radio transmission arrangement may be employed, e.g., as described in the aforementioned DE 10 2007 004 819.1.

Figure 2:
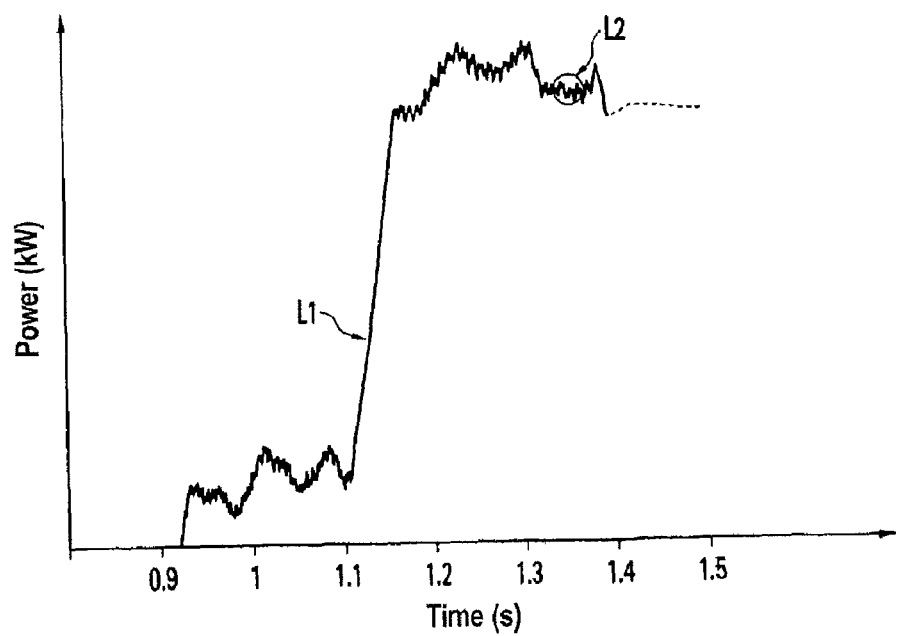
FIG. 2 shows an exemplary motor power measurement curve which can be evaluated using the exemplary methods described herein.

FIG. 2 shows, as a typical example of the evaluation according to the exemplary illustrations of a motor characteristic value, a possible pattern (not to scale) of the electric power of the motor M, as it can occur in principle, during a paint coating procedure. The relatively large power jump at L1 can arise, for example, when the main needle valve is opened, that is, on loading by the coating material. This permits the switching times to be determined rapidly and precisely and, based on the chronological pattern and the absolute value or magnitude of the power jump, other process parameters can be analyzed. The relatively small power oscillations visible at L2, for example, of the order of magnitude of 0.01%, however, are typically due to the eccentricity of a bell plate and/or the drive shaft thereof, and may thus be identified as such. The somewhat stronger power oscillations (approximately 0.05%) which are overlaid thereon can be due to mechanical shaft oscillations. Determination of the power pattern can be carried out, according to the examples described herein, by the motor control system itself, which can, in some examples, generate corresponding evaluation signals in a relatively short period of time (e.g., less than 1 ms).

Figure 3:
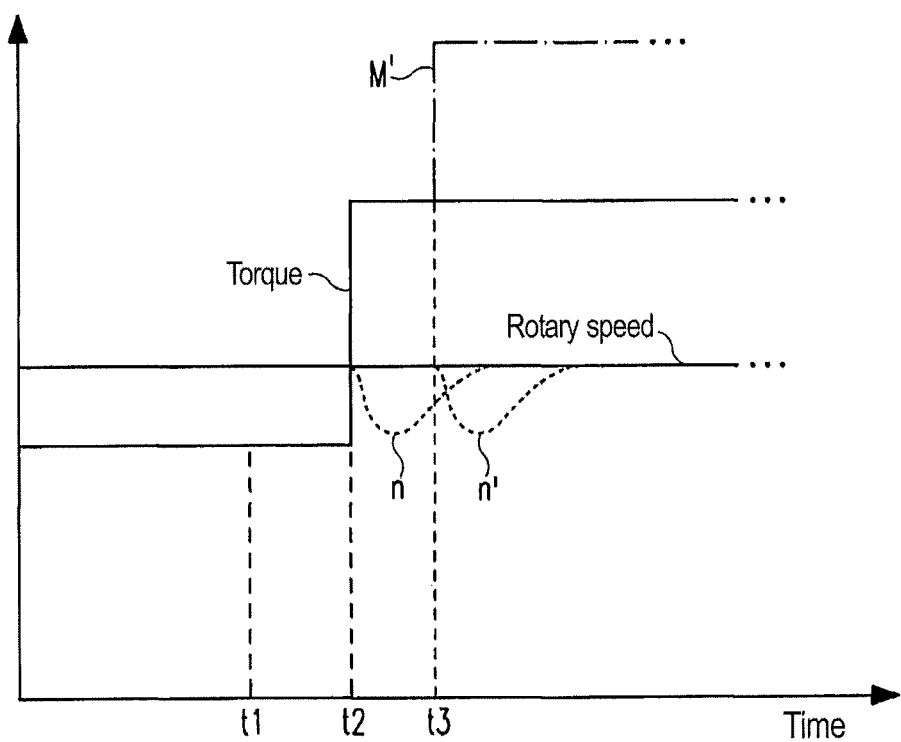
FIG. 3 is an exemplary schematic illustration of a change in motor torque over time and rotary speed as a function of a flow of material.

FIG. 3 is a schematic representation of a pattern of torque of the motor M (FIG. 1) at the start of the material flow, at a rotary speed which is held constant by the control system of the motor M (FIG. 1) as indicated. The material flow begins on opening the main needle valve of the atomizer at time point t2 due to a control signal for the main needle valve generated at time point t1 and generally loads the motor, the torque of which has therefore to increase in order to counteract the falling off of the rotary speed and maintain a generally constant rotary speed. In practice, the torque and rotary speed curves naturally do not have the exact straight-line pattern shown and in general, the rotary speed falls slightly more or slightly less, for example as indicated at n. The delay between time t1 of the control signal and time t2, which is set according to the rise of the torque, is the switching time of the main needle valve which is to be determined and which can then be corrected or compensated for on deviation from given target values.

As a result of the automatic evaluation of the absolute value of the change of torque, e.g., in the example considered, the increase at time t2, for example by the motor control system itself, further process parameters can be considered, such as, for example, the correct or incorrect pressure of the coating material on opening the main needle valve. Incorrect pressure can be due, for example, to damaged colour pressure controllers or dosing pumps and can result in painting faults.

The motor torque can change more than just once upon opening the main needle valve. If, for example, during a painting process utilizing separate materials that are loaded at different times, e.g., 2k painting, or the motor is otherwise loaded earlier by one component than by a second component, the torque can increase initially at time t2 and then again at t3, as indicated at M' and n'. A corresponding fault can thus be identified, and thereby corrected or compensated for. In this case, also, further process parameters can be analysed using the magnitude or absolute value of the change(s), such as in this case, particularly, the properties of the paint components.

In a similar way to the torque pattern of the motor, the electrical power thereof can also be evaluated. Additional evaluation possibilities include, merely as examples, evaluating a rise (negative or positive) of the respective changing values such as torque, rotary speed, power, etc.; an absolute size of the value change of, e.g., torque, rotary speed, power, etc.; and a relative size of the value change of e.g. torque, rotary speed, power, etc.

The scope of the disclosure is not limited to the previously described exemplary illustrations. Rather, a plurality of variants and modifications are possible, which likewise make use of the concepts of the inventive ideas and/or exemplary illustrations and therefore fall under the scope of protection. Reference in the specification to "one example," "an example," "one embodiment," or "an embodiment" means that a particular feature, structure, or characteristic described in connection with the example is included in at least one example or illustration. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

What is claimed is:

1. A rotary atomizer arrangement for coating workpieces, comprising a rotatably mounted spraying element for the coating material, an electric drive motor configured to drive the spraying element, an automatic control system programmed to control the electric drive motor, and an electronic evaluating apparatus programmed to evaluate at least one characteristic value of the electric drive motor to analyze at least one process parameter that represents switching times of a valve controlling an outflow of the coating material from the rotary atomizer, wherein the at least one characteristic value includes a change in electric power drawn by the electric drive motor, wherein the automatic control system is programmed to control the valve according to the determined switching time.

2. The rotary atomizer arrangement according to claim 1, wherein the characteristic value of the electric drive motor further includes at least one of: a size of an electric current of the electric drive motor, a pattern of the electric current of the electric drive motor, a torque of the electric drive motor, an acceleration of the electric drive motor, and a rotary speed of the electric drive motor.

3. The rotary atomizer arrangement according to claim 1, wherein the characteristic value of the electric drive motor is a load on the electric drive motor due at least in part to at least one of the spraying element, the coating material, an imbalance in the rotating elements, and a mounting of a drive shaft.

4. The rotary atomizer arrangement according to claim 1, wherein the electronic evaluating apparatus includes an electronic processor.

5. The rotary atomizer arrangement according to claim 1, wherein the process parameter is a volume flow rate of the coating material, and the characteristic value of the electric drive motor is an acceleration of the electric drive motor.

6. The rotary atomizer arrangement according to claim 1, wherein the process parameter represents a property of the coating material, and the characteristic value of the electric drive motor is selected from a group consisting of a torque and a rotary speed of the electric drive motor.

7. The rotary atomizer arrangement according to claim 1, wherein the process parameter is a bearing air flowing through an air bearing of a drive shaft.

8. The rotary atomizer arrangement according to claim 1, wherein the process parameter is selected from a group consisting of a presence of the spraying element, a moment of inertia of the spraying element, a material of the spraying element, and a type of the spraying element.

9. The rotary atomizer arrangement according to claim 1, wherein the switching times determined by the automatic control system of the electric drive motor are compared with target times predetermined by the automatic control system.

10. The rotary atomizer arrangement according to claim 1, wherein a fault detected by the evaluation of the characteristic value of the electric drive motor is corrected when said fault exceeds a limit value.

11. The rotary atomizer arrangement according to claim 1, wherein a transformer arrangement is provided having an electrical insulating device between a primary circuit and a secondary circuit of said transformer arrangement.

12. The rotary atomizer arrangement according to claim 1, wherein signals from at least one of the electronic evaluating apparatus and the automatic control system of the electric drive motor are galvanically separated between a first region at an elevated electrical potential and a second region at a ground potential.

13. A rotary atomizer comprising:
a spraying element;
an electric drive motor configured to drive the spraying element;
a controller programmed to control the electric drive motor and to evaluate a change in electric power drawn by the electric drive motor to determine a switching time of a valve controlling an outflow of a coating material from the spraying element based at least in part on the change in electric power,
wherein the controller is programmed to control the valve according to the determined switching time.

14. The rotary atomizer of claim 13, wherein the controller is further programmed to evaluate at least one of: an electric current of the electric drive motor, a pattern of the electric current of the electric drive motor, a torque of the electric drive motor, an acceleration of the electric drive motor, and a rotary speed of the electric drive motor.

15. The rotary atomizer of claim 13, wherein the controller is further programmed to evaluate a load on the electric drive motor, wherein the load is caused by at least one of the spraying element, the coating material, a rotational imbalance of the spraying element, and a mounting of a drive shaft.

16. The rotary atomizer of claim 13, wherein the controller is programmed to compare the switching times to predetermined target times.

17. The rotary atomizer of claim 13, wherein the controller is programmed to correct detected faults associated with operation of the electric drive motor.

18. The rotary atomizer of claim 13, further comprising a transformer arrangement having a primary circuit electrically insulated from a secondary circuit by an insulating device.

19. The rotary atomizer of claim 13, wherein signals from the controller are galvanically separated between a first region at an elevated electrical potential and a second region at a ground potential.

20. A rotary atomizer comprising:
a spraying element;
an electric drive motor configured to drive the spraying element;
a controller programmed to control the electric drive motor and to evaluate a change in electric power drawn by the electric drive motor to determine a switching time of a valve controlling an outflow of a coating material from the spraying element based at least in part on the change in electric power,
wherein the controller is further programmed to evaluate at least one of: an electric current of the electric drive motor, a pattern of the electric current of the electric drive motor, a torque of the electric drive motor, an acceleration of the electric drive motor, a rotary speed of the electric drive motor, and a load on the electric drive motor caused by at least one of the spraying element, the coating material, a rotational imbalance of the spraying element, and a mounting of a drive shaft,
wherein the controller is programmed to control the valve according to the determined switching time.

* * * * *